United States Patent [19]

Przytulla

[11] Patent Number: 4,842,802
[45] Date of Patent: Jun. 27, 1989

[54] METHOD FOR PRODUCING A HOLLOW VESSEL HAVING OUTER ANNULAR PROJECTIONS

[75] Inventor: Dietmar Przytulla, Kerpen, Fed. Rep. of Germany

[73] Assignee: Mauser-Werke GmbH, Bruhl, Fed. Rep. of Germany

[21] Appl. No.: 258,546

[22] Filed: Oct. 17, 1988

[30] Foreign Application Priority Data

Sep. 30, 1987 [DE] Fed. Rep. of Germany ....... 3732898

[51] Int. Cl.$^4$ .................. B29C 49/18; B29C 49/30
[52] U.S. Cl. .................................... 264/530; 264/534; 264/542; 425/525; 425/530
[58] Field of Search .................. 264/530, 534, 542; 425/525, 530

[56] References Cited

U.S. PATENT DOCUMENTS

| | | | |
|---|---|---|---|
| 3,843,005 | 10/1974 | Uhlig | 264/530 |
| 3,956,441 | 5/1976 | Uhlig | 264/530 |
| 4,170,622 | 10/1979 | Uhlig | 264/530 |
| 4,170,623 | 10/1979 | Dubois et al. | 264/534 |
| 4,228,911 | 10/1980 | Hammes | 264/534 |
| 4,650,627 | 3/1987 | Peters | 264/534 |

Primary Examiner—Jan H. Silbaugh
Assistant Examiner—Neil M. McCarthy
Attorney, Agent, or Firm—Pennie & Edmonds

[57] ABSTRACT

Process for producing a blown hollow vessel having an external annular projection integrally formed from the vessel wall in the blowing process. The vessel is formed initially in a mold having a reduced contour in the wall regions adjoining the annular projection. The vessel thus formed is then placed in a mold having the desired finished contour and blown to its final shape. In this manner, the vessel wall adjoining the annular projection is stretched and the inner surface of the vessel wall is smoothed in the area where the annular projection was formed.

5 Claims, 3 Drawing Sheets

METHOD FOR PRODUCING A HOLLOW VESSEL HAVING OUTER ANNULAR PROJECTIONS

BACKGROUND OF INVENTION

The invention relates to a method for production of a hollow vessel, particularly a container drum, having at least one encircling projection on the periphery of the hollow vessel. Such a hollow object or drum is made from a tubular blank which is extruded into an open mold and then blow formed in the mold once it has been closed. The encircling projection is formed directly out of the hot-formable drum material during the blow molding process by a correspondingly shaped mold slide, displaceably guided in the blowing mold.

Such projections generally have a definite cross sectional shape, profiled to serve their purpose in subsequent use, for example, as rolling treads on drums, or to provide a purchase for cranes and other handling means. If such projections are formed out of the unreinforced wall material of the blank, defects in the material can result because the blank is blown into the annular recess which forms the outward projection. The material entering and adjoining the annular recess is stretched out and thereby thinned. Subsequently, when the slide is closed, the material is folded and welded because it is still in a hot-formable condition. Weakening indentations can occur in the welding seam, creating a risk of rupture under hydraulic pressure if a filled drum is dropped.

In attempts to alleviate this problem the shell material has been thickened in the area of the projection so that there is sufficient upsetting material available in the final forming operation. This thickening of the shell material does provide some security, however, during the upsetting of the material the welding process results in one or two outward-directed indentations in the shell of the vessel. Stress concentrations are formed by these indentations when the drum is loaded and may start a tear in the shell. Various methods have been tried to counteract these indentations by adding material to the areas of indentation.

Thus, one attempt has been to provide an encircling increase in thickness of the tube blank only in the immediate area of the recess in the mold. When the tube blank is inflated during the blowing process the projecting thickened area is intended to enter the annular recess in the mold, so that the annular projection on the drum will be molded exclusively out of the added projecting material. This method of forming, out of an added bulge exclusively, suggests that no folding of the material and no welding of folds occurs.

However, because the tube blank is produced by extrusion, the desired effect has not been achieved because encircling increase in thickness of the material must be produced by orifice control and consequently by the addition of material. When, for example, a sharply defined and narrow encircling bulge is formed by the addition of material the bulge will tend to drift out of the horizontal plane in the zone of the weld seam and undulate over the periphery of the tube during the blowing operation.

During the blowing operation, the least stretching of the tube blank takes place in the zone of the weld seam, and hence the material is the thickest in this region. If, for example, two rings are provided, the curvatures of the two will be opposed to each other and they cannot be straightened out by orifice control. If the areas reinforced by added material enter the annular mold recess at all, they do so only partially. A satisfactory blown ring is then unattainable.

An objective of the present invention is therefore to correct the indentation of the welding seam of the molded projection on the interior surface of the vessel by smoothing the indentation to an extent sufficient to eliminate the undesirable stress concentrations.

SUMMARY

Accordingly, in the present invention a vessel having an integrally molded projection is formed by initially blow molding the vessel in a mold which has a reduced contour in the partial wall zones bordering the encircling projection, relative to the final profile of the vessel. After this molding, the vessel is placed in a finish mold whose inside contour matches the intended shape of the vessel. In a second blowing operation, in the finish mold, the inner contour of the vessel in the area of indentation of the projection is stretched towards the inside wall of the mold forming a smooth surface by outward migration of the drum wall in the area of the projection. By producing the vessel in this manner the weld indentations are smoothed by the stretching of the neighboring portions of the vessel wall which occurs when the vessel expands to meet the contour of the finish mold.

BRIEF DESCRIPTION OF THE DRAWINGS

FIGS. 1, 2 and 3 illustrate, in partial section, the principle of the invention, in which:

FIG. 1 shows a portion of a vessel wall having a projection as it is formed in the initial mold;

FIG. 2 shows a portion of a vessel wall, with a projection formed, which has been placed in the finish mold; and FIG. 3 shows the same portion of a vessel wall in the finish mold after the final blowing step.

FIGS. 4 to 7 illustrate, in partial section, a practical application of the method to form a drum having a carrying and handling ring, in which:

FIG. 4 shows the tube blank in the initial mold prior to forming the carrying and handling ring;

FIG. 5 shows the drum after it has been formed in the initial mold and the mold slide has formed the carrying and handling ring;

FIG. 6 shows the drum placed in the finish mold; and

FIG. 7 shows the finished drum after the final blowing.

DETAILED DESCRIPTION OF THE INVENTION

While the invention is described in connection with particular embodiments, it will be understood that it is not intended to limit the invention to these embodiments. On the contrary, it is intended to cover all alternatives, modifications and equivalents as may be included in the spirit and scope of the invention as defined by the claims.

Figure 1:
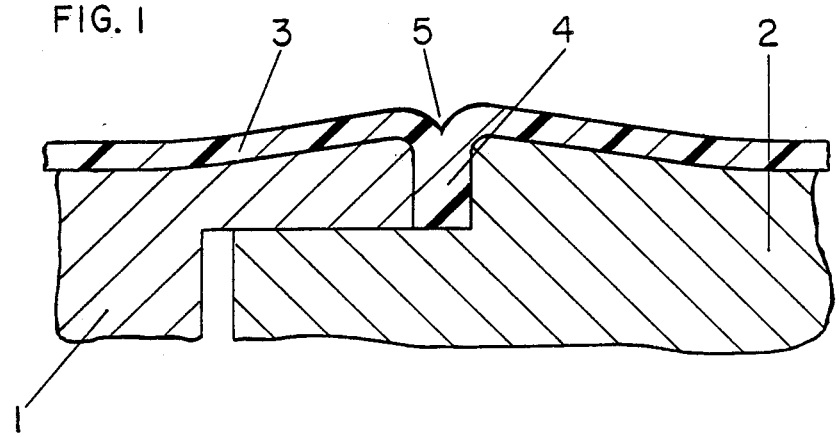

In FIG. 1, the extruded shell of material 3 has been laid against the inside wall of the mold by the action of compressed air. The mold consists of a stationary part 2 and a slide 1.

When the shell 3 migrated outward under the pneumatic pressure, the slide 1 was open, allowing the shell 3 to enter the slide space. The slide 1 is then closed and it pinches the material into a homogeneous projection 4.

The injurious indentation 5, however, remains. As may be clearly seen in FIG. 1, the inner mold parts 1 and 2 are configured in the zone of the projection 4 such that the interior space of the vessel is reduced.

Figure 2:
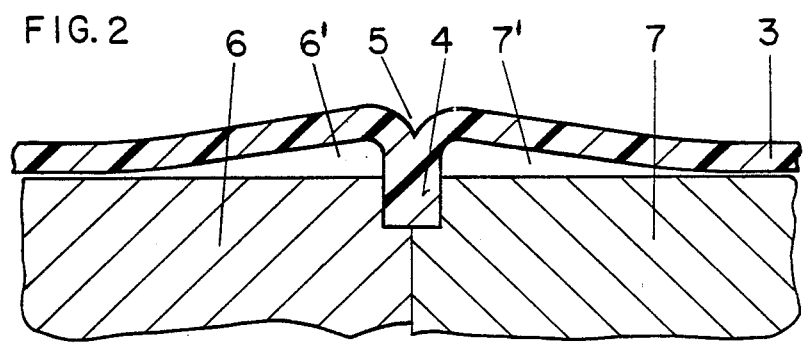
Figure 3:
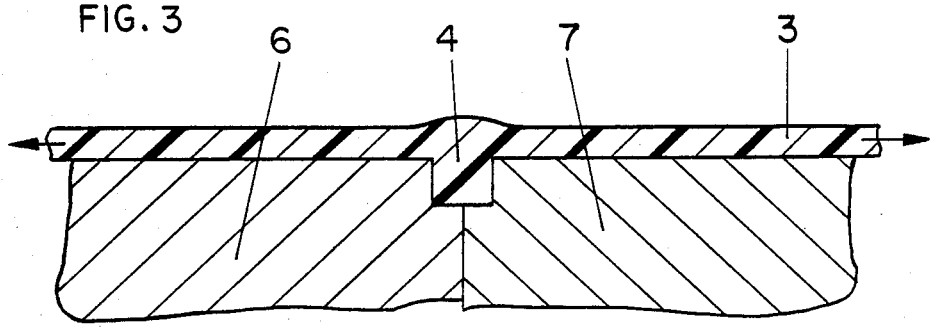
Figure 5:
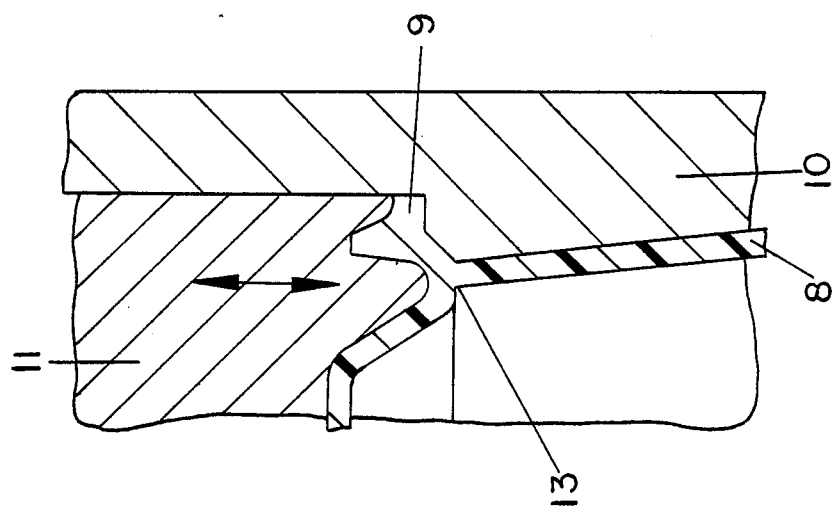

As represented in FIG. 2, the shell 3, previously formed in mold parts 1 and 2, has been placed in finish mold with mold parts 6 and 7 having enlarged inside contours. The enlargements match the intended final shape of the product. Between the shell 3 and the inside surface of the mold, clear spaces 8 and 9 are created behind the firmly grasped projection 4. When compressed air is supplied the wall zones to the left and right of the projection 4 migrate outward, in the direction of the arrows shows in FIG. 3 so that the inner surface of the shell 3 is stretched out in the area of the indentation 5. The indentation 5 is replaced by a relatively smooth surface against the inside wall of the mold.

A product of this process, illustrated in FIGS. 4 to 7, in a drum having a carrying and handling ring 9 formed by an upsetting operation directly out of the shell 8 of the drum, just below one head end.

Figure 4:
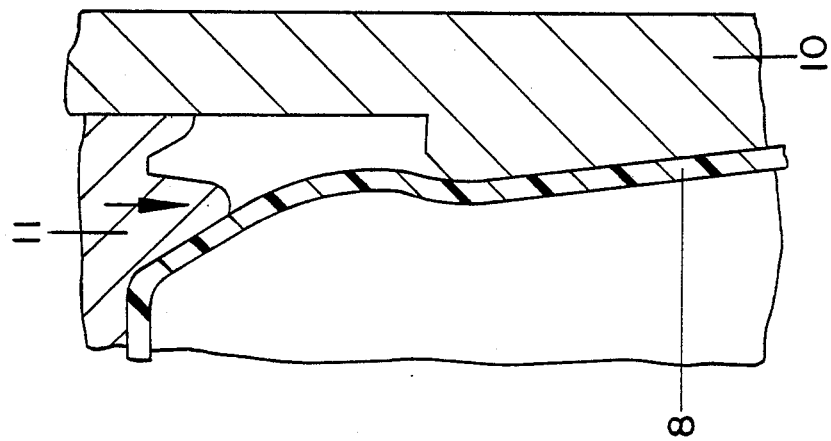
Figure 6:
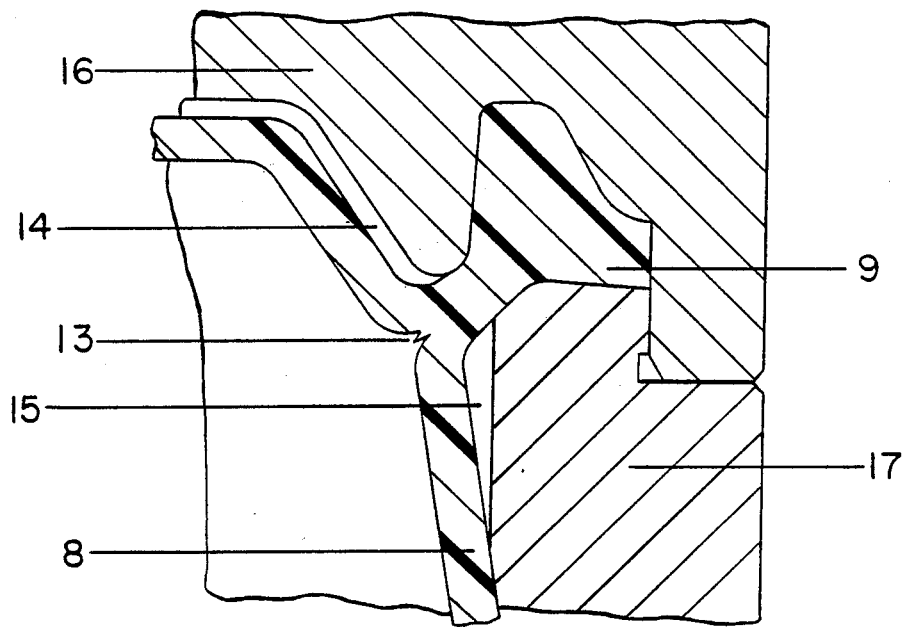

In FIG. 4, the two longitudinally parted halves of the mold 10, 11 are closed around a tube extruded into the mold, and the process of inflation has been started. Thus the drum wall 8 has bulged and been laid down in contact with the inside walls of the stationary part 10 of the closed mold and the opened slide 11. Under continued inflation pressure, the wall 8 migrates into the profiled space between slide 11 and mold part 10 and is laid against the profile surfaces.

The slide 11 is moved downward in the direction of the arrow so that the material which has entered the profiled space is squeezed together. During this upsetting operation the material is folded and the surfaces of the fold weld together by their own heat to form the homogeneous ring 9, shown in FIG. 5. The result is at least one indentation seam 13 directed from the inside out.

After a slight cooling of the mold, the slide 11 is pushed upward and the two halves of the initial mold are run into open position. The drum is removed while still in hotformable condition.

In the partial wall zones adjoining the ring 9 and located above and below the indentation seam 13 the drum has a reduced contour relative to the final shape and dimensions of the vessel. This may be seen in FIG. 6 where the initially formed drum has been locked into a finish mold by its ring 9. The inside wall surfaces of this mold 16, 17 match the intended outside contour of the finished drum. Between the slide 16 and the head surface of the drum shell 8, and between the surface of the shell 8 underneath the ring 9 and the fixed mold part 17 open spaces 14 and 15 remain. In the finish blowing operation the drum shell 8 expands into these spaces 14, 15 to assume the desired final contour. This expansion causes a stretching of the drum shell 8 to occur, smoothing out the indentation seam 13.

Figure 7:
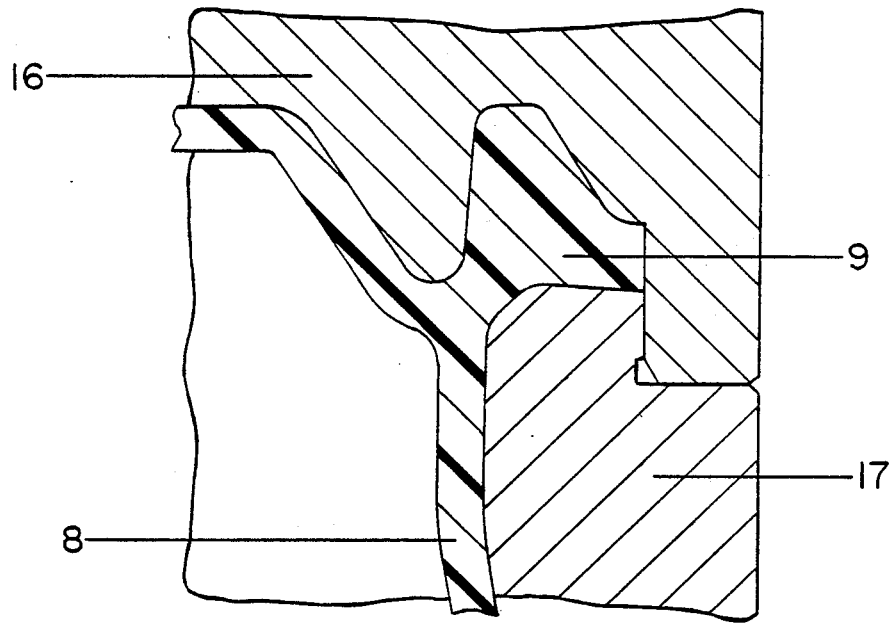

In FIG. 7 the drum is shown after it has attained its final shape in the finish mold. It is not necessary that the indentation seam 13 be completely eliminated but it must be smoothed sufficiently to eliminate and injurious stress concentration which could result in tearing.

In the production of vessels of any considerable volume in large numbers per unit time, cooling in the mold must be followed by aftercooling in a separate aftercooling unit to abate the increased subsequent shrinkage of the hollow vessels with increased output per unit time. After removal from the mold while still hot, the hollow vessel is cooled by introducing compressed air or the like. Such an aftercooling unit may easily be converted for carrying out the process according to the invention.

What is claimed is:

1. A method for producing a blow-molded hollow vessel having at least one annular projection around its wall, comprising the steps of:
    (a) extruding a tubular blank of hot formable material into a first mold cavity having an annular recess defined by a stationary mold part and a displaceable mold slide, said stationary mold part and said mold slide defining mold walls adjacent said recess which taper inwardly into said cavity;
    (b) blow molding the tubular blank to match the contour of the first mold cavity and moving the mold slide to press together the material within said recess to form an intermediate vessel having an annular projection;
    (c) placing the intermediate vessel in a second mold such that the annular projection is partially fixed within an annular recess defined by mold parts of said second mold and such that side wall regions of said intermediate vessel on each side of and adjacent said projection taper inwardly into the cavity of the second mold in spaced relation from the surfaces of said second mold parts;
    (d) blow molding the intermediate vessel to match the contour of the second mold such that said inwardly tapered regions of said intermediate vessel on each side of and adjacent said projection are blown outwardly into contact with the surfaces of said second mold parts thereby forming a final hollow vessel having a smooth inner wall surface.

2. The method as in claim 1, wherein:
    (a) the intermediate vessel is placed in the finish mold while the vessel material is still in hot formable condition.

3. A method for producing a hollow vessel having an outer wall with at least one annular projection integrally formed from the wall and encircling the vessel, comprising the steps of:
    (a) blow molding a hollow intermediate vessel comprising an annular projection and side walls on each side of and adjacent said annular projection which taper inwardly toward a center of said hollow intermediate vessel; and,
    (b) blow molding the intermediate vessel to an intended final shape while fixing the annular projection to prevent its increase in diameter and while allowing said inwardly tapering side walls to expand outwardly from said center of said hollow intermediate vessel and thereby forming said intended final shape hollow vessel having a smooth wall surface.

4. The method as in claim 3, wherein the first blow molding step (a) includes the steps of:
    (a) extruding a tubular blank of hot formable material into an initial mold; and
    (b) blow molding the tubular blank to form the intermediate vessel.

5. The method as in claim 3, wherein the second blow molding step (b) includes the steps of:
    (a) placing the intermediate vessel in a finish mold; and
    (b) blow molding the intermediate vessel to the intended finished shape.

* * * * *